United States Patent
Gianoglio et al.

(10) Patent No.: US 6,684,145 B1
(45) Date of Patent: Jan. 27, 2004

(54) DRIVE CONTROL SYSTEM FOR ACHIEVING TARGET DRIVESHAFT POWER IN A MOTOR VEHICLE

(75) Inventors: Renato Gianoglio, Turin (IT); Attilio Porta, Turin (IT); Massimo Lupo, Rivalta (IT); Stefano Re Fiorentin, Grugliasco (IT); Giovanni Ellena, Turin (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 99 days.

(21) Appl. No.: 10/030,044

(22) PCT Filed: Jul. 3, 2000

(86) PCT No.: PCT/EP00/06184

§ 371 (c)(1),
(2), (4) Date: Apr. 11, 2002

(87) PCT Pub. No.: WO01/02210

PCT Pub. Date: Jan. 11, 2001

(30) Foreign Application Priority Data

Jul. 5, 1999 (IT) .......................... TO99A0579

(51) Int. Cl.$^7$ ................................ G06F 7/00
(52) U.S. Cl. .................. 701/54; 477/84; 280/12.14; 123/399
(58) Field of Search ............... 701/54, 51, 53, 701/69, 79, 93, 96; 477/84, 91, 110; 280/12.14; 123/399, 332

(56) References Cited

U.S. PATENT DOCUMENTS

| | | | |
|---|---|---|---|
| 4,353,272 A | 10/1982 | Schneider et al. | |
| 4,580,465 A | 4/1986 | Omitsu | |
| 4,811,713 A | 3/1989 | Shimada et al. | |
| 5,428,539 A | * 6/1995 | Kawamura et al. | 701/84 |
| 5,914,575 A | * 6/1999 | Sasaki | 318/150 |
| 5,991,683 A | * 11/1999 | Takaoka et al. | 701/102 |
| 6,371,885 B1 | * 4/2002 | Kobayashi et al. | 477/115 |
| 6,565,482 B2 | * 5/2003 | Kobayashi et al. | 477/174 |

FOREIGN PATENT DOCUMENTS

EP 0 559 342 A2 9/1993
WO WO 97 37 868 A 10/1997

\* cited by examiner

Primary Examiner—William A. Cuchlinski, Jr.
Assistant Examiner—Olga Hernandez
(74) Attorney, Agent, or Firm—Sughrue Mion, PLLC (57) ABSTRACT

An internal combustion engine (E) has associated control devices (ECU, GSCU, SCU) for controlling the engine in a manner such that the engine delivers a driving torque (CM) which is variable in dependence on predetermined measured parameters, in particular on the position ($\alpha$) of the accelerator pedal (AP), and sensors (S1, S2) for detecting the position ($\alpha$) of the accelerator pedal (AP), and the rate of rotation ($\omega_M$) of the shaft (M) of the engine (E) or the forward speed (v) of the motor vehicle, respectively. The control system (ECU, GSCU, SCU) associated with the engine (E) is arranged:—to acquire from the sensors (S1, S2) the position ($\alpha$) of the accelerator pedal (AP) and the rate of rotation ($\omega_M$) of the engine (E), or the forward speed (v) of the motor vehicle;—to determine, in accordance with predetermined methods, the power ($P_T$) to be applied to the driving wheels in dependence on the measured position ($\alpha$) of the accelerator pedal (AP) and on the calculated or acquired forward speed (v) of the vehicle, and to calculate, in dependence on the value determined for the power ($P_T$) to be applied to the driving wheels and on the forward speed (v) of the vehicle, the driving torque ($C_{MREF}$) which should correspondingly be delivered by the engine (E), and to control the engine (E) in a manner such that it delivers the driving torque ($C_{MREF}$) thus calculated.

8 Claims, 8 Drawing Sheets

DRIVE CONTROL SYSTEM FOR ACHIEVING TARGET DRIVESHAFT POWER IN A MOTOR VEHICLE

This is a National stage entry under 35 U.S.C. §371 of Application No. PCT/EP00/06184 filed Jul. 3, 2000; the disclosure of which is incorporated herein by reference.

The present invention relates to a drive control system for a motor vehicle.

More specifically, the subject of the invention is a drive control system for a motor vehicle, provided with:

an internal combustion engine with associated control means for operating the engine in a manner such that the engine delivers a driving torque which is variable in dependence on predetermined measured parameters, in particular on the position of an accelerator pedal, and sensor means for providing electrical signals indicative of the position of the accelerator pedal and of the rate of rotation of the shaft of the engine or of the forward speed of the motor vehicle.

WO-A-97 37 868 discloses such a system, in which the accelerator position and the vehicle speed are used to determine, from stored graphs, the value of a correspondingly desired tractive force. The latter is multiplied by the vehicle speed to determine the corresponding value of the required power. At the same time the transmission ratio is shifted to an optimum ratio (if different therefrom), which is determined as a function of the accelerator position and the vehicle speed. The torque to be delivered by the engine is then computed on the basis of both the required power and the optimum transmission ratio.

EP-A-0 559 342 discloses a system for improving the fuel economy of a car equipped with an automatic transmission having a lock-up clutch. The system controls both the engine and the automatic transmission on the basis of a target driving torque corresponding to the stroke of the acceleration pedal.

U.S. Pat. No. 4,353,272 discloses a system for controlling the engine-transmission assembly of a motor-vehicle wherein the position of the accelerator defines the power setpoint of the engine.

According to the prior art, the command imparted by means of the accelerator is interpreted by an engine management unit in accordance with a so-called "driveability map" which is stored in a memory and which causes a predetermined driving torque delivered by the engine to correspond unequivocally to each position of the accelerator pedal and to each rare of rotation of the engine shaft.

According to the rate of revolution of the engine, the command imparted by the accelerator is thus "translated" by the engine management unit directly into a value of the driving torque delivered to the engine shaft. The power or the torque which is actually applied to the driving wheels thus depends not only on the driving torque thus delivered by the engine but also on the transmission ratio put into effect by the gearbox.

SUMMARY OF THE INVENTION

The object of the present invention is to provide an innovative drive control system for a motor vehicle which, in particular, enables the engine to be managed with more degrees of freedom than with conventional systems. This and other objects are achieved, according to the invention, by the system the main characteristics of which are defined in appended claim 1.

The control system according to the invention is applicable in particular and advantageously to integrated drive control in a motor vehicle having a servo-assisted gearbox comprising an input shaft which can be coupled to the engine shaft by means of a servo-controlled clutch, and in which first and second electrically-operated actuator means are associated with the gearbox and with the clutch, respectively.

In motor vehicles having servo-assisted or "automatic" gearboxes, drive control, that is, control of the power or torque applied to the driving wheels and exchanged with the ground, is the combined result of the command imparted by the driver by means of the accelerator pedal and of the gear ratio selected by the driver.

In these motor vehicles, if the driver is not particularly skilled, drive control, that is, the torque actually applied to the driving wheels and exchanged with the ground is not generally optimal.

A further object of he present invention is therefore to provide an integrated drive control system which is better than the conventional method of separate control of the engine and of the gearbox, permitting improved and more direct control of the power applied to the driving wheels, greater driving comfort and optimized use of the engine in accordance with predetermined objectives such as a reduction in consumption and/or exhaust emissions.

This and other objects are achieved, according to the invention, by an integrated drive control system the main characteristics of which are defined in appended claim 3.

As will be appreciated better from the following part of the present description, a system of this type according to the invention is based upon the concept of controlling, directly by means of the accelerator pedal, the power which is applied to the driving wheels of the vehicle and not the driving torque delivered by the power unit. In other words, it is not purely and simply the engine which is controlled by the driver means of the accelerator pedal, but rather the dynamics of the forward movement of the vehicle.

Further characteristics and advantages of the invention will become clear from the following detailed description, given purely by way of non-limiting example, with reference to the appended drawings, in which:

Figure 1:
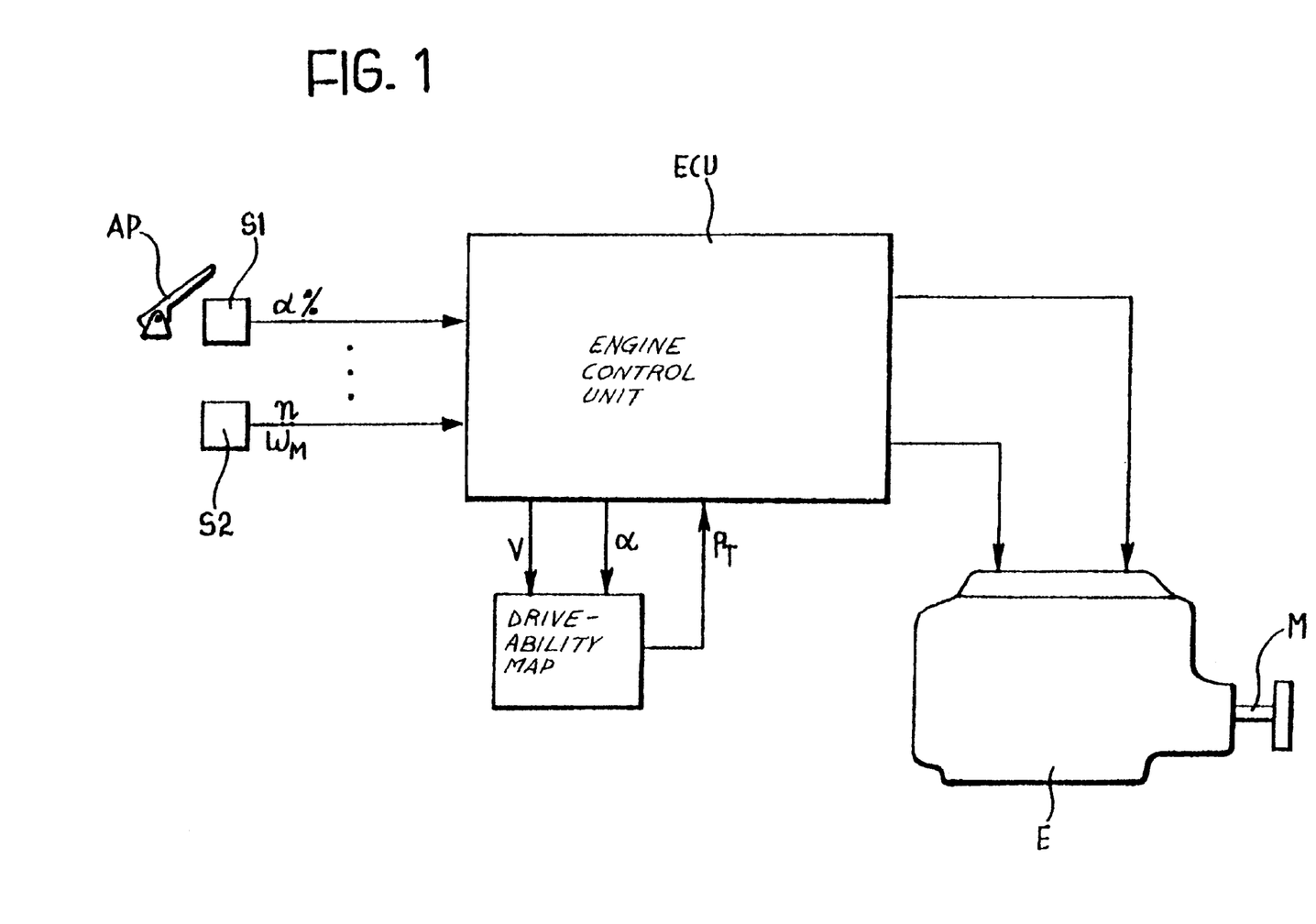
FIG. 1 is a block diagram of a control system according to the invention.

In FIG. 1, the internal combustion engine of a motor vehicle is indicated E and its shaft is indicated M.

An electronic control unit ECU of known type is associated with the engine E. Various sensor devices are connected to the control unit ECU. In particular, a sensor S1 associated with the accelerator pedal AP of the motor vehicle is connected to the unit ECU. This sensor supplies to the unit ECU signals indicative, for example, of the degree of operation α of the pedal, as a percentage, which is variable between 0% (pedal released) and 100% (pedal fully depressed).

A further sensor S2 supplies to the unit ECU signals indicative of the rate of rotation $\omega_M$ of the shaft M of the engine E, that is, of the number of revolutions n of the shaft per unit of time.

DETAILED DESCRIPTION OF THE INVENTION

The control unit ECU is arranged to implement a procedure for controlling the torque $C_M$ delivered to the shaft M by the engine E in dependence on the position α of the accelerator pedal AP, detected by means of the sensor S1.

For this purpose, an electronic memory M1 is associated with the unit ECU and stores data for defining the power $P_T$ to be applied to the driving wheels of the motor vehicle in dependence on the position α of the accelerator pedal AP and on the longitudinal speed v of the motor vehicle. The data stored in the memory M1 defines a "driveability map" which will be described further below and which, in contrast with conventional engine-management systems, causes predetermined values of the power $P_T$ which is to be applied to the driving wheels to correspond unequivocally to values of the position α of the accelerator and to the forward speed v of the motor vehicle.

In other words, in engine management systems produced up to now, the command imparted by the accelerator pedal is interpreted in accordance with a "driveability map" which correlates the position of the pedal directly with specific variables or parameters of the engine, in particular, the number of revolutions n per unit of time and the driving torque $C_M$ delivered to the shaft. In the system according to the invention, the position α of the accelerator pedal AP is interpreted differently, that is, in accordance with a "driveability map" which correlates the position α with variables or parameters relating to the dynamics of the vehicle, in particular to its forward speed v and to the power $P_T$ applied to the driving wheels.

Figure 3:
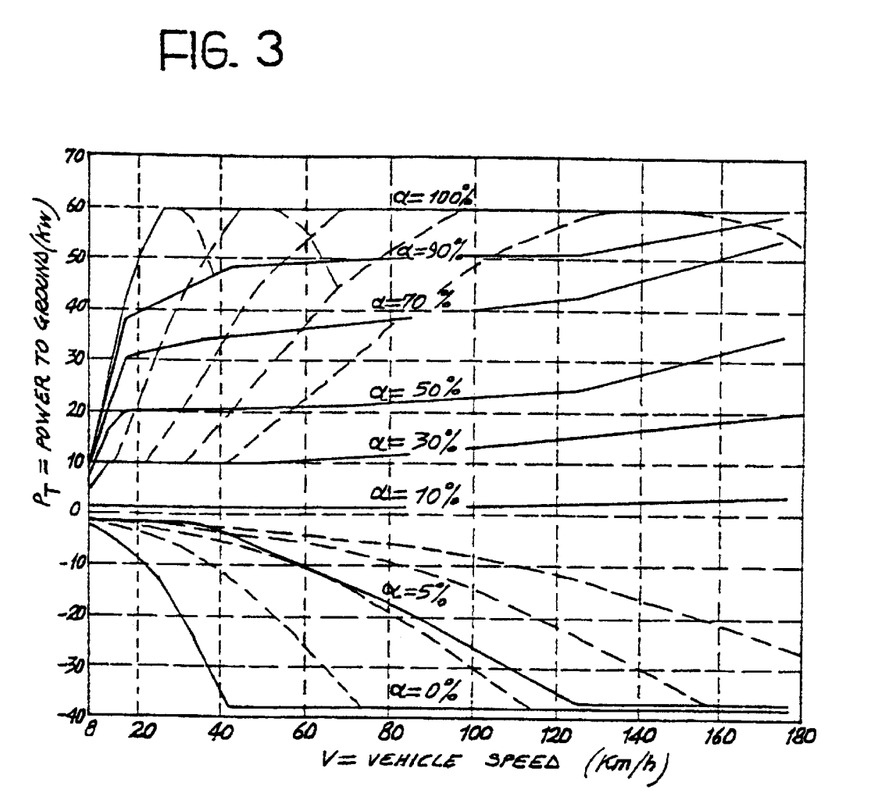
FIG. 3 is a graph which shows the correlation between the position of the accelerator pedal, the forward speed of the vehicle, and the power applied to the driving wheels, implemented in a system according to the invention.

The driveability map stored in the memory M1 is basically a representation, in the form of discrete values, of predetermined curves for the engine E, such as the curves shown by way of example in FIG. 3. These curves, which are predetermined, for example, in the manner which will be described below, correlate the position α of the accelerator pedal with the power $P_T$ to be applied to the driving wheels, for each value of the forward speed v of the vehicle.

The control unit ECU is arranged to perform the following operations cyclically:

acquisition of the signals supplied by the sensors S1, S2, which are indicative of the position α of the accelerator pedal AP and of the number of revolutions n of the engine E per unit of time, calculation of the forward speed v of the motor vehicle, determination of the value of the power $P_T$ to be applied to the wheels, by access to the driveability map held in the memory M1, on the basis of the acquired value of the position α of the accelerator pedal and of the calculated value of the forward speed v of the motor vehicle; the determination of the value $P_T$ generally involves interpolation between the discrete values stored in the memory, calculation of the driving torque $C_{MREF}$ to be delivered by the engine E, on the basis of the power value $P_T$ determined in the previous step, control of the engine, E (injection of fuel, possibly advance of the ignition, etc.) in a manner such that it delivers to the shaft M a driving torque equal to the torque $C_{MREF}$ calculated.

As an alternative to the method set out above, the sensor S2 may be a sensor which detects the forward speed and which can supply the unit ECU directly with the data relating to this speed which, in this case, does not therefore have to be determined by calculation.

Further characteristics of the control system according to FIG. 1 will become clear from the following description of an integrated drive control system in a motor vehicle provided with a servo-assisted gearbox.

Figure 2:
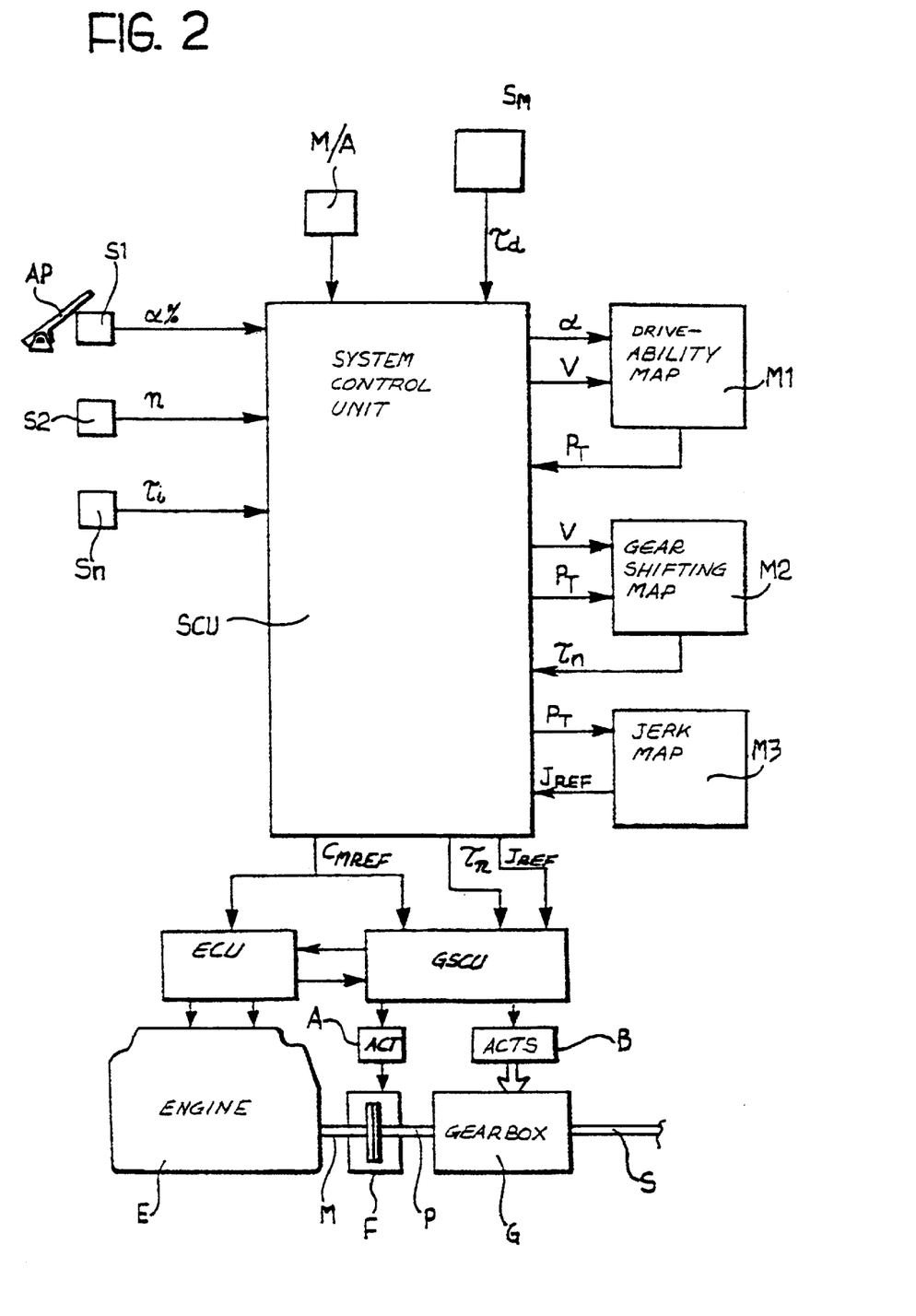
FIG. 2 is a block diagram which shows a possible architecture of an integrated engine-control system and of a servo-assisted gearbox, according to the invention.

In FIG. 2, the internal combustion engine of a motor vehicle is indicated E. The shaft of the engine, indicated M, can be coupled to the input shaft or primary shaft P of a gearbox G by means of a friction clutch F. The gearbox G has an output shaft S which is coupled to the driving wheels of the motor vehicle in a known manner, not shown.

The gearbox G is servo-assisted. Actuators A and B, associated with the friction clutch F and, with the gearbox G, respectively, are, for example, of the electro-hydraulic type and can bring about disengagement/engagement of the clutch F and engagement/disengagement of the gears, respectively, under the control of a gear-shift control unit GSCU.

An electronic control unit ECU of known type is associated with the engine E. This unit can control the engine E in a manner such that the engine can deliver, by means of its shaft M, a driving torque which is variable in dependence on predetermined measured quantities or parameters.

In the drive control system of FIG. 2, the control unit ECU of the engine E and the gear-shift control unit GSCU are in turn controlled by a system control unit SCU. Various sensor devices are connected to this system control unit. In particular, a sensor S1 associated with the accelerator pedal AP of the motor vehicle is connected to the unit SCU. This sensor supplies to he unit SCU signals inddicative, for example, of the degree of operation α of the pedal, as a percentage, which is variable between 0% (pedal released) and 100% (pedal fully depressed).

A further sensor S2 supplies to the unit SCU signals indicative of the rate of rotation $\omega_M$ of the shaft M of the engine E, that is, of the number of revolutions n of the shaft per unit of time.

In this case also, the sensor S2 could alternatively be a sensor for detecting the forward speed of the vehicle.

Further sensors, indicated Sn, are connected to the system control unit SCU in order to supply thereto signals indicative of the gear or transmission ratio put into effect by the gearbox G.

The system control unit SCU is arranged to implement an automatic drive control procedure, in particular, in dependence on the position of the accelerator pedal AP detected by the sensor S1.

For this purpose, the unit SCU is associated with a first electronic memory M1 in which data are stored for defining the power $P_T$ to be applied to the driving wheels of the motor vehicle, in dependence on the position $\alpha$ of the accelerator pedal AP and on the longitudinal speed v of the motor vehicle. The data stored in the memory M1 define a "driveability map" which, as already stated with reference to the system of FIG. 1, causes predetermined values of the power $P_T$ to be applied to the driving wheels a correspond unequivocally to values of the position $\alpha$ of the accelerator and to the forward speed v of the motor vehicle.

The driveability map stored in the memory M1 is basically a representation, in the form of discrete values, of predetermined curves for the specific engine E and for the specific gearbox G associated therewith, such as the curves shown by way of example in FIG. 3. These curves, which are predetermined, for example, in the manner which will be described below, correlate the position $\alpha$ of the accelerator pedal with the power $P_T$ to be applied to the driving wheels, for each value of the forward speed v of the vehicle.

The driveability curves shown in FIG. 3 have been determined in the manner which will now be described, for a specific engine-transmission unit, in particular, for the following:

Diesel cycle internal combustion engine with "common rail" fuel supply, Fiat model DI/TCA M724, displacement 1.91 l;

Fiat C510 automatic gearbox with the following gear ratios: 3.908-2.238-1.44-1.03-0.767 in gears 1-2-3-4-5, respectively, axle ratio $\tau_p$=3.15;

transmission efficiency $\eta_t$=0.95;

rolling radius of the wheels R=0.277 m;

moment of inertia of the wheels $J_W$=2.2465 Kg m².

Figure 3A:
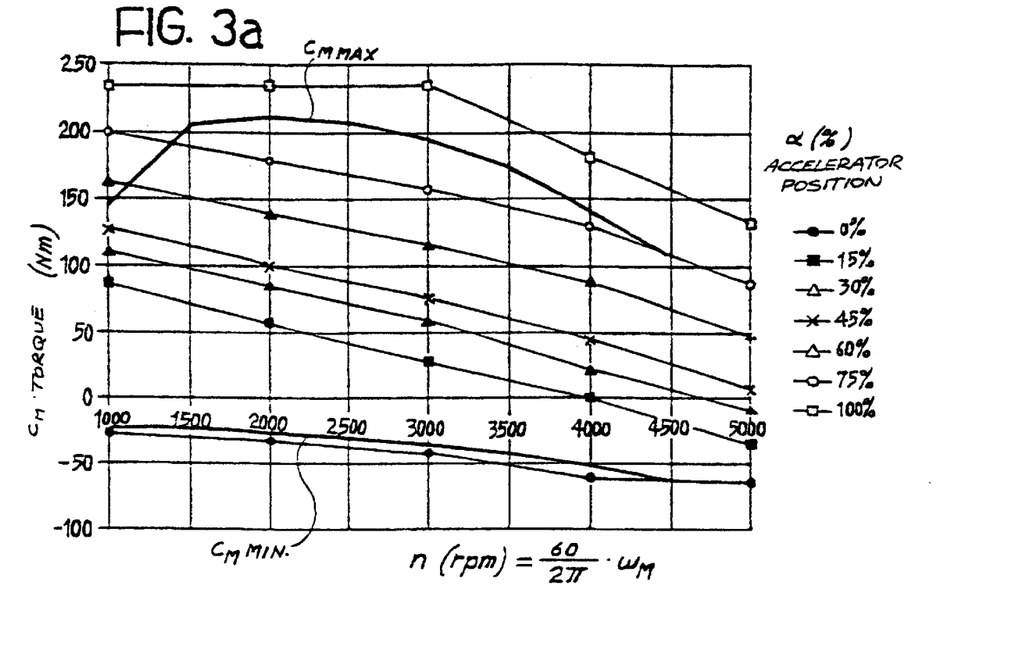
FIG. 3a shows curves of the torque delivered, as a function of the rate of rotation and with variations in the position of the accelerator pedal, for a specific internal combustion engine.

FIG. 3a shows the characteristic curves of torque $C_M$ as a function of the rate of revolution n (RPM) with variations in the accelerator position $\alpha$ (%), for the above-mentioned engine.

The characteristic torque curves shown in FIG. 3a correspond substantially to the "driveability map" conventionally used for conventional engine control in which the command imparted by the accelerator pedal is interpreted substantially as a request for driving torque to be delivered by the engine.

The curves of FIG. 3a characterize the behaviour of the specific engine under examination and can be derived experimentally in a manner known to experts in the art.

FIG. 3a gives, in particular, the curves $C_{MMAX}$ and $C_{MMIN}$ which define, respectively, the maximum torque and the minimum torque which can be delivered by the engine at the various rates of rotation.

The driving torque $C_M$ delivered by the engine E and the rate of rotation $\omega_M$ of the engine shaft are correlated with the torque $C_T$ applied to the wheels and hence exchanged with the ground, as well as with the forward speed v of the motor vehicle, by the following equations:

$$C_T = C_M \cdot \eta_t \cdot \tau_p \cdot \tau_i \quad (1)$$

$$v = \omega_M \cdot R / (\tau_p \cdot \tau_i) \quad (2)$$

in which $\eta_t$ is the transmission efficiency, $\tau_p$ is the axle transmission ratio, $\tau_i$ is the transmission ratio engaged in the gearbox G, and R is the rolling radius of the wheels.

Figure 3B:
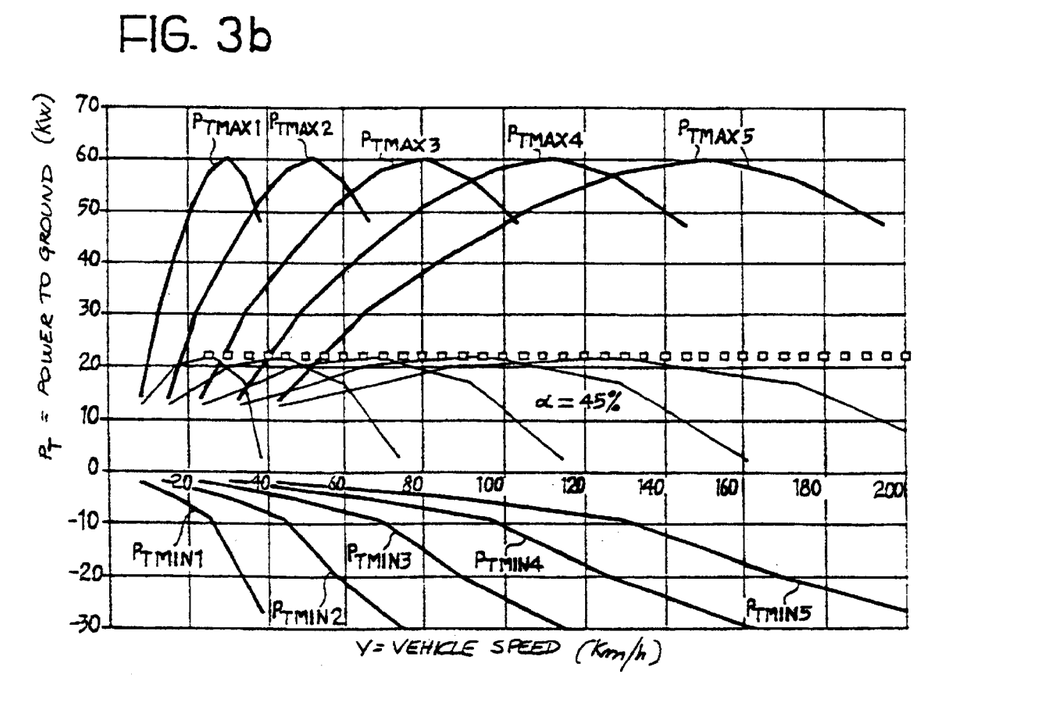
FIG. 3b shows curves of the power applied to the driving wheels, as a function of the forward speed of the vehicle and with variations in the position of the accelerator pedal, for a specific engine/transmission unit.

By applying to the curves of FIG. 3a the transformation equations (1) and (2), as well as the known relationship which links power to torque, it is possible easily to obtain for the engine-transmission unit under examination, the curves shown in FIG. 3b which express the power $P_T$ applied to the wheels for each value of the forward speed v of the vehicle, with variations of the position $\alpha$ of the accelerator pedal. In order not to overburden the graphical representation, FIG. 3b gives the curves of maximum power $P_{TMAXi}$ (with i=1 to 5) and the curves of minimum power $P_{TMINi}$ (also with i=1 to 5) for each gear or transmission ratio of the gearbox G.

Moreover, only the power curves relating to the accelerator pedal position $\alpha$=45% are shown specifically in FIG. 3b.

In order to define a driveability map in terms of power applied to the driving wheels in dependence on the forward speed of the vehicle and with variations of the accelerator pedal position, an examination of FIG. 3b suggests, for example, that, at low values of the vehicle speed, in first gear, it may be advantageous to adopt, in the driveability map to be implemented, a simple transposition of the original map $C_M$=f(n, $\alpha$) into the corresponding variables $P_T$, v, so that the characteristics with regard to the moving-off of the vehicle from a standstill, as well as the driveability characteristics at low speeds are kept unchanged. At faster speeds, in all of the gears or transmission ratios, it is possible to prescribe in the driveability map that the power applied to the wheels $P_T$ as the vehicle speed V increases should have a substantially constant or progressively increasing curve in order to compensate partially for the resistance of the vehicle to forward movement.

With these criteria, it is possible, for example, to define the driveability map shown in FIG. 3 from the graphs of FIG. 3b. This driveability map is only one of the infinite number of possible maps which can be predetermined on the basis of widely varying criteria. In general, however, in defining the driveability map, the gear ratios selected for the transmission can be left out of consideration. This independence ensures continuity of torque upon changing from one gear to another: in order to apply to the driving wheels the power $P_T$ corresponding to a given accelerator pedal position $\alpha$ and to a given forward speed v of the motor vehicle, any one of the possible gears the domain (power, speed) of which contains the point under examination may equally well be used.

In the system of FIG. 2, the driveability map stored in the memory M1 is formed in a manner such that the command imparted by the accelerator AP is translated into the application of a power $P_T$ to the wheels, irrespective of the gear ratio put into effect by the gearbox G.

By virtue of this fact, the selection of the gear or transmission ratio is no longer linked to subjective criteria dependent on the vehicle user's driving style: since the power applied to the driving wheels is that corresponding to the driver's "request", effected by means of the accelerator pedal, the gear ratio with which the power is achieved is of secondary importance. In this connection, naturally, there are limitations:

for reasons of comfort (predominantly of an acoustic nature) it is necessary to avoid gear changes at high rates of rotation of the engine E when possible, and the frequency of gear changes should be kept as low as possible, for reasons of performance and comfort.

Once the two requirements given above have been satisfied, the selection of the transmission ratio or gear to be put into effect can in principle be performed with a certain amount of freedom, according to methods predefined in order to achieve predetermined objectives such as minimizing fuel consumption and/or exhaust emissions.

For example, with the aim of minimizing fuel consumption, since the specific consumption decreases as the load applied to the engine E increases, it is advantageous to use the highest possible gear, that is, the lowest possible transmission ratio, in any condition. This translates into the need to use, as gear shifting boundary lines, the same power curves relative to the various gears.

Possible criteria for selecting the gear shifting boundary lines in order to minimize consumption are, for example, the following:

the transition between two adjacent gears or transmission ratios, both when changing up and when changing down, is defined by a boundary line which, for positive values of the power $P_T$ assigned to the accelerator pedal position α, extends over a range of speeds of advance of the vehicle which should be achievable within the maximum and minimum limits of the power which can be produced by the engine, both with the original gear and with the final gear, for an upward gear shift, that is, for example, from second gear to third gear, the gear shifting boundary one corresponds to the power curve $P_{T\,MAX}$ of the final gear, safeguarding the driveability of the motor vehicle, particularly at low rates of rotation of the engine E;

for downward gear shifts, that is, for example, from third gear to second gear, it is necessary to provide for a different boundary line from that provided for the corresponding upward gear shift (from second gear to third gear) in order to avoid "overgearing" phenomena at the boundary line; for this purpose, a "hysteresis" is introduced by shifting the boundary line for the downward shift towards lower speeds of advance of the vehicle by a suitable amount.

Figure 4:
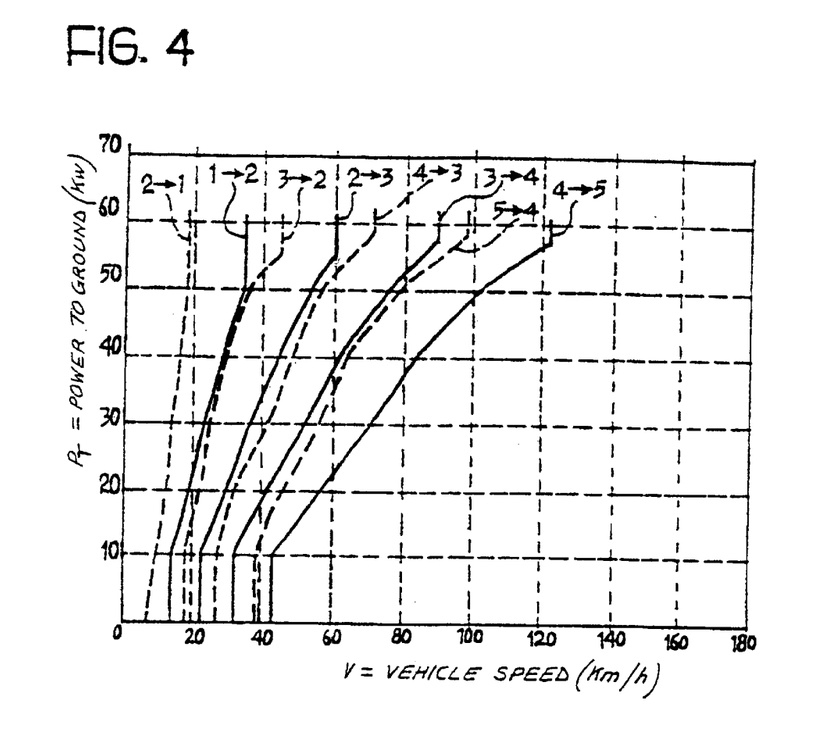
FIG. 4 is a graph relating to the method of bringing about a change of transmission ratio, implemented in a system according to the invention.

The graph of FIG. 4 shows the boundary lines for the various gear shifts, obtained in accordance with the rules set out above for the engine-transmission unit defined above.

The gear shifting boundary lines shown in the graph of FIG. 4 can be translated into a corresponding map of discrete values, for example, in accordance with Table 1 below:

TABLE 1

Map of gear shifts for minimum consumption

| 1 → 2 | | 2 → 1 | | 2 → 3 | | 3 → 2 | | 3 → 4 | | 4 → 3 | | 4 → 5 | | 5 → 4 | |
|---|---|---|---|---|---|---|---|---|---|---|---|---|---|---|---|
| $P_T$ | V | $P_T$ | V | $P_T$ | V | $P_T$ | V | $P_T$ | V | $P_T$ | V | $P_T$ | V | $P_T$ | V |
| 0 | 15 | 0 | 7 | 0 | 23 | 0 | 19 | 0 | 33 | 0 | 28 | 0 | 44 | 0 | 39 |
| 11 | 15 | 11 | 10 | 11 | 23 | 11 | 19 | 11 | 33 | 11 | 28 | 11 | 44 | 11 | 39 |
| 14 | 16 | 14 | 11 | 15 | 27 | 15 | 21 | 18 | 40 | 18 | 31 | 20 | 56 | 20 | 46 |
| 20 | 19 | 20 | 12 | 20 | 30 | 20 | 23 | 20 | 42 | 20 | 32 | 21 | 58 | 21 | 48 |
| 30 | 24 | 30 | 15 | 30 | 37 | 30 | 26 | 30 | 53 | 30 | 41 | 30 | 70 | 30 | 56 |
| 40 | 29 | 40 | 17 | 40 | 44 | 40 | 30 | 40 | 62 | 40 | 49 | 40 | 84 | 40 | 64 |
| 50 | 35 | 50 | 19 | 50 | 55 | 50 | 37 | 50 | 77 | 50 | 57 | 50 | 102 | 50 | 80 |
| 60 | 35 | 60 | 19 | 54 | 60 | 54 | 46 | 57 | 90 | 57 | 70 | 57 | 122 | 57 | 98 |
| 60 | 35 | 60 | 19 | 60 | 60 | 60 | 46 | 60 | 90 | 60 | 70 | 60 | 122 | 60 | 98 |

The map or table given above is advantageously stored in a further memory M2 associated with the system control unit SCU (FIG. 2).

The way in which the above-described drive control system operates will now be described in general terms with reference to the flow chart of FIG. 5.

Figure 5:
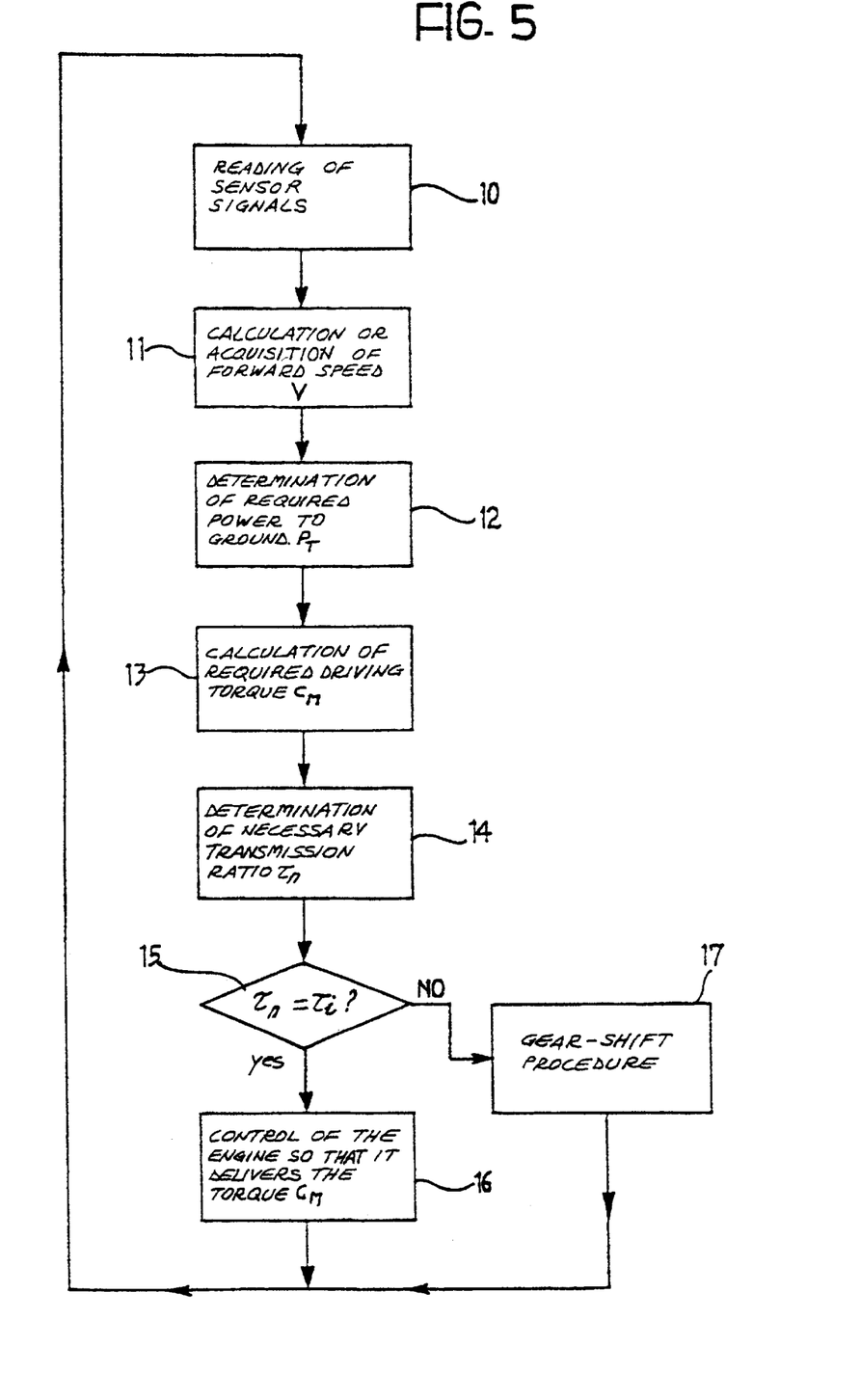
FIG. 5 is a flow chart showing the way in which a system according to the invention operates.

The system control unit SCU is arranged to perform the following operations cyclically:

acquisition of the signals supplied by the sensors S1 and Sn and indicative of the position α% of the accelerator pedal AP, and of the gear or transmission ratio $τ_i$ currently engaged in the gearbox G (box 10 of FIG. 5);

calculation of the forward speed v of the motor vehicle in accordance with equation (2) given above, or acquisition of the speed value from the corresponding sensor (box 11);

determination of the value of the power $P_T$ to be applied to the wheels, by accessing the driveability map contained in the memory M1, on the basis of the acquired accelerator-pedal position valued and of the calculated or acquired value of the forward speed v of the motor vehicle; the determination of the value $P_T$ generally involves interpolation between discrete values stored in the memory (box 12);

calculation of the driving torque $C_{MREF}$ to be delivered by the engine E, on the basis of the power value $P_T$ determined the previous step, and by applying equation (1) given above (box 13);

determination of the necessary gear or transmission ratio $τ_n$ by means of the gear shifting map stored in the memory M2, on the basis of the calculated or acquired value of the forward speed v and of the power value $P_T$ determined (box 14);

checking whether the transmission ratio $τ_n$ is equal to the transmission ratio $τ_i$ currently engaged (box 15);

if $τ_n=τ_i$, the system control unit SCU supplies to the management unit ECU of the engine E signals indicative of the calculated value of the required driving torque $C_{MREF}$; the engine management unit ECU controls injection of fuel in a manner such that the engine E delivers the driving torque $C_{MREF}$ (box 16);

if $τ_n$ is other than $τ_i$, the system control unit SCU sends to the gear-shift control unit GSCU signals requesting a change of transmission ratio, with an indication of the ratio $τ_n$ to be put into effect; the system control unit SCU also supplies to the engine management unit ECU and to the gear-shift control unit GSCU torque reference signals indicative of the target driving torque value $C_{MREF}$ to be delivered by the engine E upon completion of the gear-shifting stage; the gear-shift control unit GSCU supervises the changing of the transmission ratio, controlling the actuators A and B associated with the clutch F and with the gearbox G, respectively (box 17).

The gear-shift control unit GSCU may advantageously be arranged to supervise the gear shift with the use of a simple mathematical model of the transmission of the motor vehicle which is valid for the gear-shifting stages.

The complexity of the gear-shift control results from the need to coordinate the operation of the engine E and of the actuators A and B associated with the friction clutch F and with the gearbox G in a manner such as to achieve as comfortable and rapid a gear-shift transition as possible.

The gear or transmission-ratio shifting operation involves basically the following steps:

reduction of the driving torque $C_M$ delivered by the engine E and disengagement of the clutch F;

disengagement of the current gear, selection and engagement of the new gear, and re-engagement of the clutch F and restoration of the driving torque.

In order to achieve a good compromise of gear shifting comfort without detriment to performance, the control system must reduce the time required for the gear shifting operation as far as possible and must modulate the drive reduction and increase stages to take account of the driver's "feel".

In an embodiment which will now be described, this is achieved by implementing a "jerk-oriented" strategy, that is, a strategy which tends to reduce the jerk, that is, the time differential of the longitudinal acceleration of the motor vehicle.

It has in fact been found by statistical analyses that the jerk measured is a good indicator of the degree of comfort of the gear shift perceived by the passengers. The jerk is also a parameter which is correlated with the driver's perception of gear shifting comfort. However, the driver's judgement is also affected by the integral of the longitudinal acceleration over the gear shifting period as a whole, which is correlated with a sensation of slowness.

In the drive control system according to the invention, the system control unit SCU may be arranged not only to decide on the implementation of a gear shift in the manner described above, but also to assign a target value $J_{REF}$ for the jerk during the gear-shift stages.

For this purpose, the system control unit SCU may be associated with a further memory M3 (FIG. 2) in which the target jerk values, as functions of the power $P_T$ to be applied to the wheels, derived experimentally with a motor vehicle provided with the engine-transmission unit under consideration, are stored.

Figure 6:
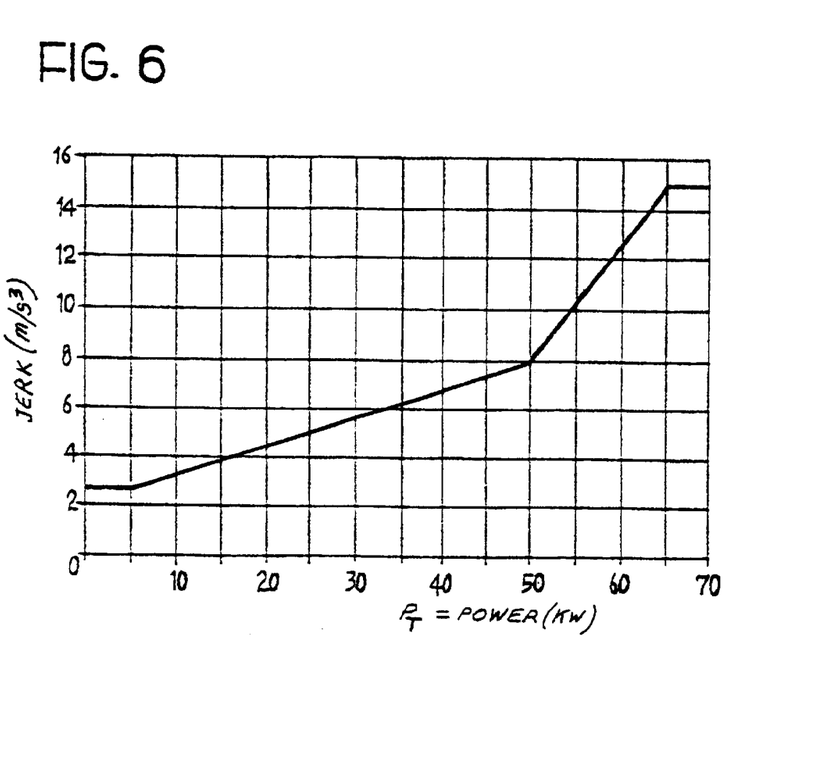
FIG. 6 is a further graph showing the curve of the longitudinal reference jerk as a function of the power applied to the wheels, used in a system according to the invention.

On the basis of experimental measurements, it is possible, for example, to define a curve of target jerk values as functions of the power $P_T$, for example, in accordance with FIG. 6. Values which represent the curve of jerk as a function of power $P_T$ in discrete form are stored in the memory M3.

In order to implement a gear shifting procedure, the system control unit SCU also assigns to the gear-shift control unit GSCU the jerk reference value $J_{REF}$ selected or determined by interpolation by access to the memory M3, on the basis of the power $P_T$ required which has been determined in the manner described above.

Figure 7:
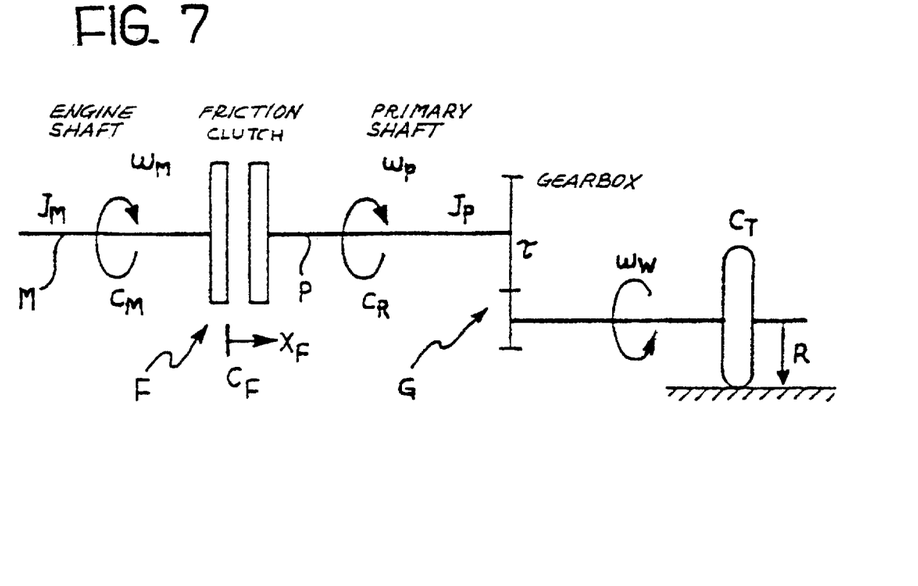
FIG. 7 is a schematic view of a transmission between the engine shaft and the driving wheels in a motor vehicle provided with a gearbox.

The model of the engine/transmission/driving wheels unit which is used to determine in real time the driving torque to be delivered by the engine E and the torque to be transmitted to the driving wheels during a gear shifting stage is based on the basic diagram shown in FIG. 7 and on the corresponding equations:

Clutch F Engaged $$C_M(t) - C_R(t) = (J_M + J_P) \cdot \frac{d\omega_M}{dt} \quad (3)$$

Clutch F Disengaged $$C_M(t) - C_F(X_F(t)) = J_M \cdot \frac{d\omega_M}{dt} \quad (4)$$

$$C_F(X_F(t)) - C_R = J_P \cdot \frac{d\omega_P}{dt} \quad (5)$$

in which (see also FIG. 6):

$C_M$, $J_M$, $\omega_M$ are the torque delivered by the shaft M of the engine E, the moment of inertia of the engine shaft M, and the rate of rotation of this shaft, $C_F$ and $X_F$ are the torque transmitted by the friction clutch F to the primary shaft P of the gearbox G and the position of the movable member of the friction clutch F, respectively, $C_R$, $J_P$, $\omega_P$ are the resisting torque on the primary shaft P of the gearbox G, the equivalent moment of inertia on the primary gearbox shaft P, and the angular velocity of the primary shaft, respectively.

With reference to equations (3) and (5) given above, the resisting torque $C_R$ may be considered, as a first approximation, to be constant during gear shifting stages.

On the basis of equations (3) to (5), the individual stages of a gear-shift can be analyzed as follows.

Torque Reduction Stage

Figure 8:
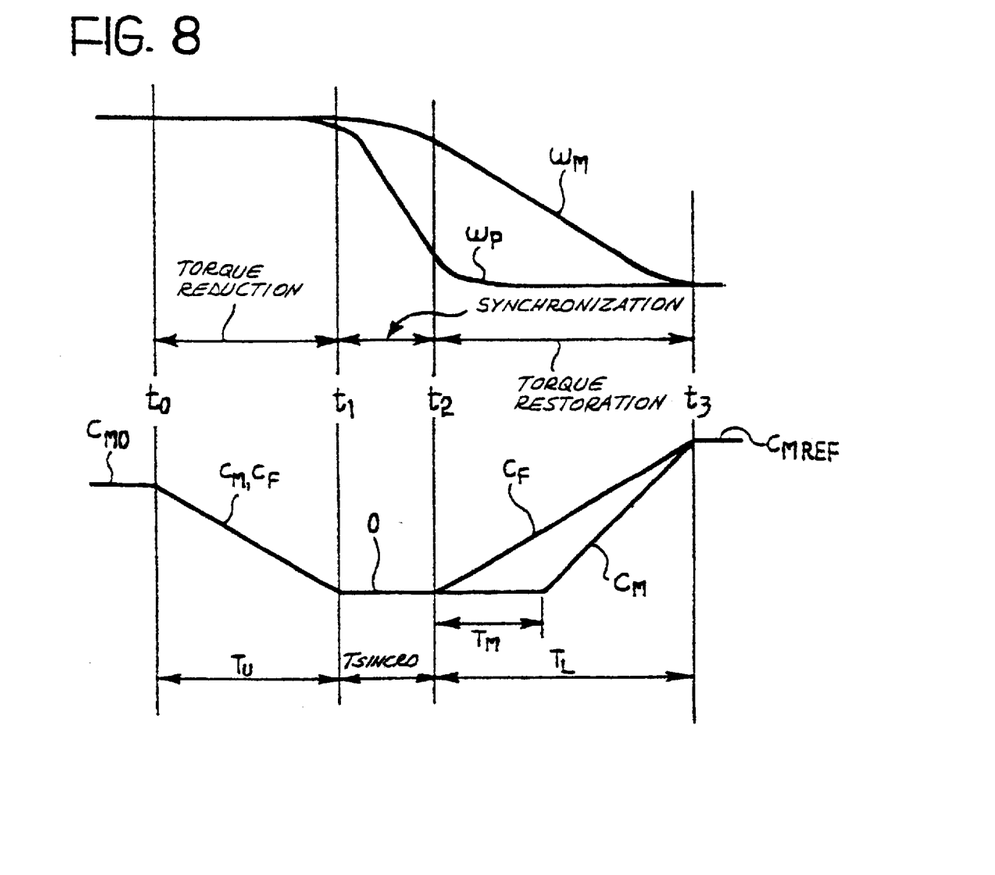
FIG. 8 is a set of graphs which show curves of rates of rotation and torques, as functions of time given on the abscissa, in the course of a gear change in a system according to the invention.

With reference to FIG. 8, this stage lasts from an initial time to until a subsequent time $t_1$ and has a duration $T_U$.

During this stage, the driving torque $C_M$ has to be reduced progressively to zero, starting from its initial value $C_{M0}$. The torque $C_F$ transmitted by the friction clutch F must simultaneously also be reduced to zero, whilst still being kept equal to the driving torque $C_M$, as shown in the lower graph of FIG. 8. During the torque reduction stage, the following are therefore the initial conditions:

$$t = t_0: C_M = C_{M0}, C_R = C_{R0} = C_{M0} - (J_M + J_P) \cdot \frac{d\omega_M}{dt}$$

and the following are the final conditions:

$$t = t_1: C_M = C_F = 0$$

During the transition between $t=t_0$ and $t=t_1$, on the basis of equation (3) above, and upon the assumption that the resisting torque $C_R$ remains constant:

$$\frac{d\omega_M}{dt} = \frac{C_M - C_{R0}}{J_M + J_P} \quad (6)$$

In equation (6), the moment of inertia $J_P$ is that corresponding to the transmission ratio $\tau_i$ which is engaged at the start of the gear shifting stage.

The longitudinal acceleration $a_x$ of the motor vehicle is correlated with the angular acceleration of the shaft M of the engine E by means of the following equation:

$$a_x = \frac{d\omega_w}{dt} \cdot R = \frac{d\omega_M}{dt} \cdot \frac{R}{\tau_i} = \frac{C_M - C_{RO}}{J_M + J_P} \cdot \frac{R}{\tau_i} \quad (7)$$

where $\omega_W$ and R are the angular velocity and the rolling radius of the driving wheels, respectively.

The jerk is the time derivative of the longitudinal acceleration $a_x$:

$$jerk = \frac{da_x}{dt} = \frac{R}{(J_M + J_P) \cdot \tau_i} \cdot \frac{dC_M}{dt} \quad (8)$$

In order for the jerk to remain constant and equal to the predetermined reference value $J_{REF}$ during this stage, the driving torque $C_M$ must decrease in accordance with a linear curve. Since, upon completion of the torque reduction stage, the torque $C_F$ transmitted by the friction clutch F must also be zero, the same linear reduction curve also applies to the torque $C_F$, as shown in the left-hand portion of the lower graph of FIG. 8. Thus:

$$C_M(t) = C_F(t) = C_{MO} - \frac{C_{MO}}{T_C} \cdot t \quad (9)$$

The duration $T_U$ of the torque reduction stage is determined unequivocally in accordance with equation (8) above, on the basis of the prescribed jerk reference value $J_{REF}$:

$$T_U = C_{MO} \cdot R / J_{REF} \cdot (J_M + J_P) \cdot \tau_i \quad (10)$$

Synchronization Stage

During this stage, the friction clutch F is disengaged, the gear ratio $\tau_i$ is disengaged, and the new gear ratio $\tau_n$ is engaged.

During these operations, the angular velocity of the primary gearbox shaft P changes from $\omega_W \tau_i$ to $\omega_W \tau_n$, in a time which depends on the performance of the synchronizer and on the characteristics of the actuator A associated with the friction clutch F.

Upon completion of this stage:

$$t=t_2 : \omega_P = \omega_W(t_2) \cdot \tau_n \quad (11)$$

Torque Re-application Stage

This stage (FIG. 8) has a duration of $T_L = t_3 - t_2$.

During this stage, the driving torque $C_M$ and the torque $C_F$ transmitted by the friction clutch F have to synchronize the angular velocities $\omega_M$ of the engine shaft and $\omega_P$ of the primary shaft P of the gearbox G in order to reach the previously calculated final value $C_{M\,REF}$ (box 13 of FIG. 5).

During this stage, the following are therefore the initial conditions:

$$t=t_2 : C_M = C_F = 0,\ C_R = C_{Ro}$$

and the following are the final conditions:

$$t=t_3 : \omega_M = \omega_P,\ C_M = C_F = C_{MREF}$$

During the transition, between the times $t_2$ and $t_3$, equation (5) given above applies and, upon the assumption that the resisting torque $C_R$ remains constant and equal to the value $C_{RO}$:

$$\frac{d\omega_P}{dt} = \frac{C_F - C_{RO}}{J_P} \quad (12)$$

where $J_P$ is now calculated on the basis of the new transmission ratio $\tau_n$.

During this stage, the longitudinal acceleration $a_x$ of the vehicle is:

$$a_x = \frac{d\omega_w}{dt} \cdot R = \frac{d\omega_P}{dt} \cdot \frac{R}{\tau_n} = \frac{C_M - C_{RO}}{J_M + J_P} \cdot \frac{R}{\tau_n} \quad (13)$$

Correspondingly, the jerk has the following expression:

$$jerk = \frac{da_x}{dt} = \frac{R}{(J_P \cdot \tau_n)} \cdot \frac{dC_F}{dt} \quad (14)$$

In order also to keep the jerk value constant during this stage, it is necessary to control both the driving torque CM and the torque CF transmitted by the clutch F in accordance with linear curves, as shown in the right-hand portion of the lower graph of FIG. 8, so that:

$$C_F(t) = \frac{C_{MREF}}{T_L} \cdot t \quad (15)$$

$$C_F(t) = \frac{C_{MREF}}{T_L - T_M} \cdot t \quad \text{per } t > (t_2 + T_M) \quad (16.1)$$

$$C_M(t) = 0 \quad \text{per } t_2 < t < (t_2 + T_M) \quad (16.2)$$

The overall duration $T_L$ of the torque re-application stage is determined on the basis of equations (14) and (15) and by prescribing that the jerk should adopt the reference value $J_{REF}$:

$$T_L = \frac{C_{MREF} \cdot R}{J_{REF} \cdot J_P \cdot \tau_n} \quad (17)$$

The period of time $T_M$ represents the period necessary for the shaft M of the engine E to slow down as a result of the torque transmitted by the clutch F. This duration of this period is determined on the basis of the constraint relating to the synchronization of the angular velocity $\omega_M$ of the engine shaft M with the angular velocity $\omega_P$ of the primary gearbox shaft P.

The duration of the interval $T_M$ can therefore be calculated by solving a set of two equations corresponding to the time integrals of equations (4) and (5) given above between $t_2$ and $t_3$. The solving of this set of equations gives:

$$T_M = 2J_M[\omega_M(t_2) - \omega_P(t_2)] / C_{MREF} + + T \cdot J_M[2C_{RO}/C_{MREF} - 1] / J_P \quad (18)$$

The engine management unit ECU and the gear-shift control unit GSCU are arranged to implement the rules of variation given above for the driving torque $C_M$ and the torque $C_F$ transmitted by the clutch F.

The automatic drive control system described above may, however, be formed in a manner such as to permit "manual" control of the servo-assisted gearbox G, substantially in accordance with the prior art. For this purpose, a selector M/A (FIG. 2) operable manually by the user in order to select the type of operation, that is, manual or automatic, and additional sensor devices $S_M$ for supplying to the unit SCU signals indicative of the transmission ratio which the driver wishes to engage, are also connected to the system control unit SCU. The sensors $S_M$ may be position sensors associated with devices of known type for selecting the transmission ratio, such as joystick-type devices, push-buttons, or up/down selection levers.

In the "manual" operating mode, the system control unit SCU does not implement the control methods described above, but is limited to transferring to the unit ECU the command imparted by the driver by means of the accelerator pedal AP in order to obtain from the engine E the driving torque $C_M$ corresponding to the accelerator pedal position α, and to transferring to the gear-shift control unit GSCU signals indicative of the transmission ratio which the driver wishes to engage.

The architecture of the control system shown in FIG. 2 is only one of various possible architectures.

Figure 9:
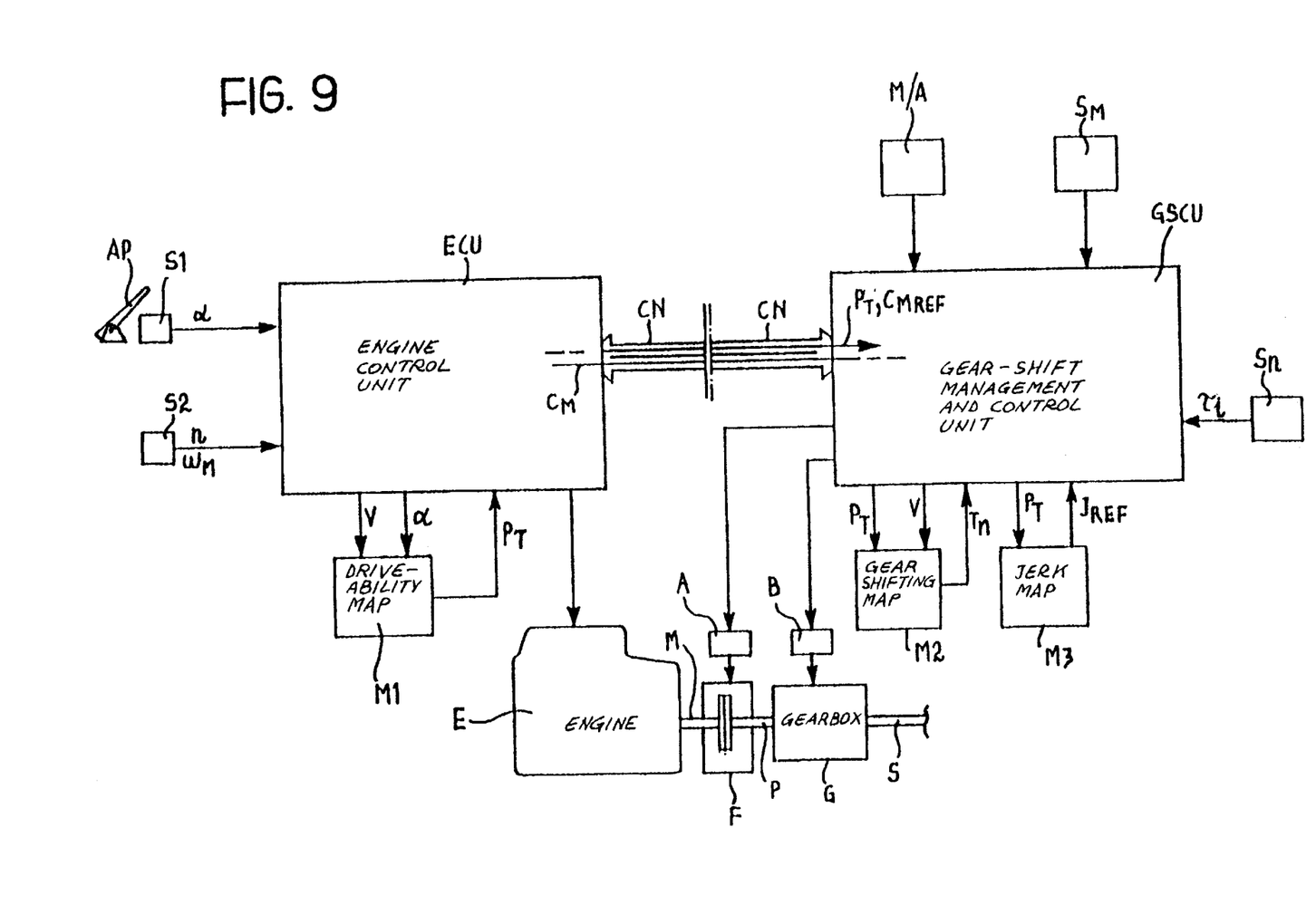
FIG. 9 shows an alternative system architecture to that shown in FIG. 2.

A further possible architecture is that shown in FIG. 9 in which parts and elements already described have again been attributed the same alphanumeric references as were used above.

In the arrangement according to FIG. 9, the functions of the control unit SCU of FIG. 2 are divided between the engine E control unit ECU and the gear-shift control unit GSCU, which are interconnected with each other by means of a communication network CN, for example, of the CAN type. In particular, the memory M1 with the driveability map is associated with the engine control unit ECU to which the sensors S1 (position α of the accelerator pedal AP) and S2 (angular velocity $\omega_M$ of the shaft M of the engine E) are also connected.

The memory M2 (gear shifting map) and the memory M3 (jerk map) if it is present, as well as the sensor $S_n$ (ratio $\tau_i$ engaged) and the selector M/A and the sensor $S_M$, however, are associated with the gear-shift control unit GSCU.

During automatic, operation, the unit ECU calculates the forward speed v, determines the value of the power $P_T$, and calculates the corresponding torque $C_{MREF}$. It transmits the value of the speed v and of the power $P_T$ to the unit GSCU which determines the transmission ratio $\tau_n$ to be put into effect as well as the jerk reference value $J_{REF}$ and then controls the change of transmission ratio, if necessary, substantially as described above, in coordination with the unit ECU.

Naturally, it is possible to adopt other architectures with different distributions of the tasks between the control units used, or even with a single control unit which controls the entire system alone.

What is claimed is:

1. A drive control system for a motor vehicle, provided with:
    an internal combustion engine (E) with associated control means (ECU, GSCU, SCU) for operating the engine in a manner such that the engine (E) delivers a driving torque ($C_M$) which is variable in dependence on predetermined measured parameters, in particular, on the position (α) of the accelerator pedal (AP), and with
    sensor means (S1, S2) for providing electrical signals indicative of the position (α) of the accelerator pedal (AP) and of the rate of rotation ($\omega_M$) of the shaft (M) of the engine (E) or of the forward speed (v) of the motor vehicle, respectively,
    the control means (ECU, GSCU, SCU) being arranged:
        to acquire from the sensor means (S1, S2) the position (α) of the accelerator pedal (AP) and the rate of rotation ($\omega_M$) of the shaft (M) of the engine (E), or the forward speed (v) of the motor vehicle,
        to determine the power ($P_T$) to be applied to the driving wheels in dependence on the measured position (α) of the accelerator pedal (AP) and on the calculated or acquired forward speed (v) of the vehicle; characterized in that said control means (ECU, GSCU, SCU) are arranged to calculate, in dependence on the value determined for the power (PT) to be applied to the driving wheels and on the forward speed (v) of the vehicle, the driving torque ($C_{MREF}$) which should correspondingly be delivered by the engine (E), and to control the engine (E) in a manner such that it delivers the driving torque ($C_{MREF}$) thus calculated the system further comprising first memory means (M1) which are associated with the control means and in which there are stored data defining the power ($P_T$) to be applied to the driving wheels of the vehicle in dependence on the position (α) of the accelerator pedal (AP) and on the longitudinal speed (v) of the vehicle, the control means being arranged to determine the power ($P_T$) to be applied to the driving wheels on the basis of the data held in the first memory means (M1).

2. A control system according to claim 1, for a motor-vehicle provided with
    a servo-assisted gearbox (G) with an input shaft (P) which can be coupled to the shaft (M) of the engine (E) by means of a servo-assisted clutch (F), first and second electrically-operated actuator means (B, A) being associated with the gearbox (G) and with the clutch (F), respectively,
    and further sensor means (Sn) for supplying electrical signals indicative of the transmission ratio (τ) engaged in the gearbox (G),
    the system being characterized in that the control means are arranged to implement an automatic drive control procedure in dependence on the position ( ) of the accelerator pedal (AP);
    the control means being arranged, in particular,
    to acquire, from the sensor means (S1, S2, Sn) the position (α) of the accelerator pedal (AP), the rate of rotation ($\omega_M$) of the shaft (M) of the engine (E), or the forward speed of the motor vehicle (v), and the transmission ratio ($\tau_M$) put into effect by the gearbox (G);
    to calculate or to acquire the forward speed (v) of the vehicle;
    to determine, in accordance with predetermined methods, the power ($P_T$) to be applied to the driving wheels in dependence on the detected position (α) of the accelerator pedal (AP) and on the forward speed (v) of the vehicle;
    to calculate, in dependence on the value determined for the power ($P_T$) to be applied to the driving wheels and on the forward speed (v) of the vehicle, the driving torque ($C_{MREF}$) which should correspondingly be delivered by the engine (E);
    to determine, in accordance with predetermined methods, the transmission ratio ($\tau_n$) to be put into effect by the gearbox (G), in dependence on the value determined for the power ($P_T$) to be applied to the driving wheels and on the forward speed (v) of the vehicle, and
    to check whether the transmission ratio ($\tau_n$) to be put into effect corresponds to the transmission ratio engaged ($\tau_i$), and
    if the result is positive, to control the engine (ECU) in a manner such that it delivers the calculated driving torque ($C_{MREF}$), and
    if the result is negative, to control the implementation of the change to the transmission ratio ($\tau_n$) to be put into effect, controlling the engine (ECU) in a manner such that, upon completion of the operation to change to the transmission ratio ($\tau_n$) to be put into effect, the engine (E) delivers a driving torque substantially equal to the driving torque ($C_{MREF}$) calculated.

3. A control system according to claim 2, comprising second memory means (M2) which are associated with the control means and in which data are stored for defining the transmission ratio or gear ($\tau_n$) to be put into effect by the gearbox (G) in dependence on the power ($P_T$) to be applied to the driving wheels and on the longitudinal speed (v) of the vehicle, and in which the control means are arranged to determine the transmission ratio ($\tau_n$) to be put into effect on the basis of the data held in the second memory means (M2).

4. A control system according to claim 2, in which the control means are arranged:
- to determine, in accordance with predetermined methods, a reference value ($J_{REF}$) for the time differential of the longitudinal acceleration ($a_x$) of the motor vehicle, in dependence on the value determined for the power ($P_T$) to be applied to the driving wheels,
- to generate reference signals indicative of a reference driving torque ($C_{MREF}$), and
- to control the change to the transmission ratio ($\tau_n$) to be put into effect in a manner such as to keep the time derivative of the longitudinal acceleration ($a_x$) of the vehicle substantially constant and equal to the reference value ($J_{REF}$).

5. A control system according to claim 4, comprising third memory means (M3) which are associated with the control means and in which predetermined values of the time differential of the longitudinal acceleration ($a_x$) of the vehicle as a function of the power ($P_T$) to be applied to the driving wheels are stored.

6. A control system according to claim 4, in which the control means are arranged to control the engine (E) and the actuator means (A, B) associated with the clutch (F) and with the gearbox (G) during a gear shifting stage in a manner such that the driving torque ($C_M$) delivered by the engine (E) and the torque ($C_F$) transmitted by the clutch (F) to the gearbox (G) vary in accordance with respective substantially linear curves.

7. A control system according to claim 3, in which the second memory means (M2) contain, in the power to ground/forward speed plane ($P_T$/v), data representative of gear shifting boundary lines, a boundary line associated with a shift from one gear to the immediately higher (lower) gear being different from that associated with the reverse change.

8. A control system according to claim 1, comprising manually-operated selector means (M/A) for supplying the control means with signals providing selectively for manual drive control or for automatic drive control.

* * * * *